Dec. 28, 1937.　　　K. K. PROBST　　　2,103,915
VEHICLE CONSTRUCTION

Original Filed May 15, 1934　　4 Sheets-Sheet 1

INVENTOR
Karl K. Probst
BY
Braselton, Whitcomb Davies
ATTORNEYS.

Dec. 28, 1937.  K. K. PROBST  2,103,915
VEHICLE CONSTRUCTION
Original Filed May 15, 1934   4 Sheets-Sheet 2
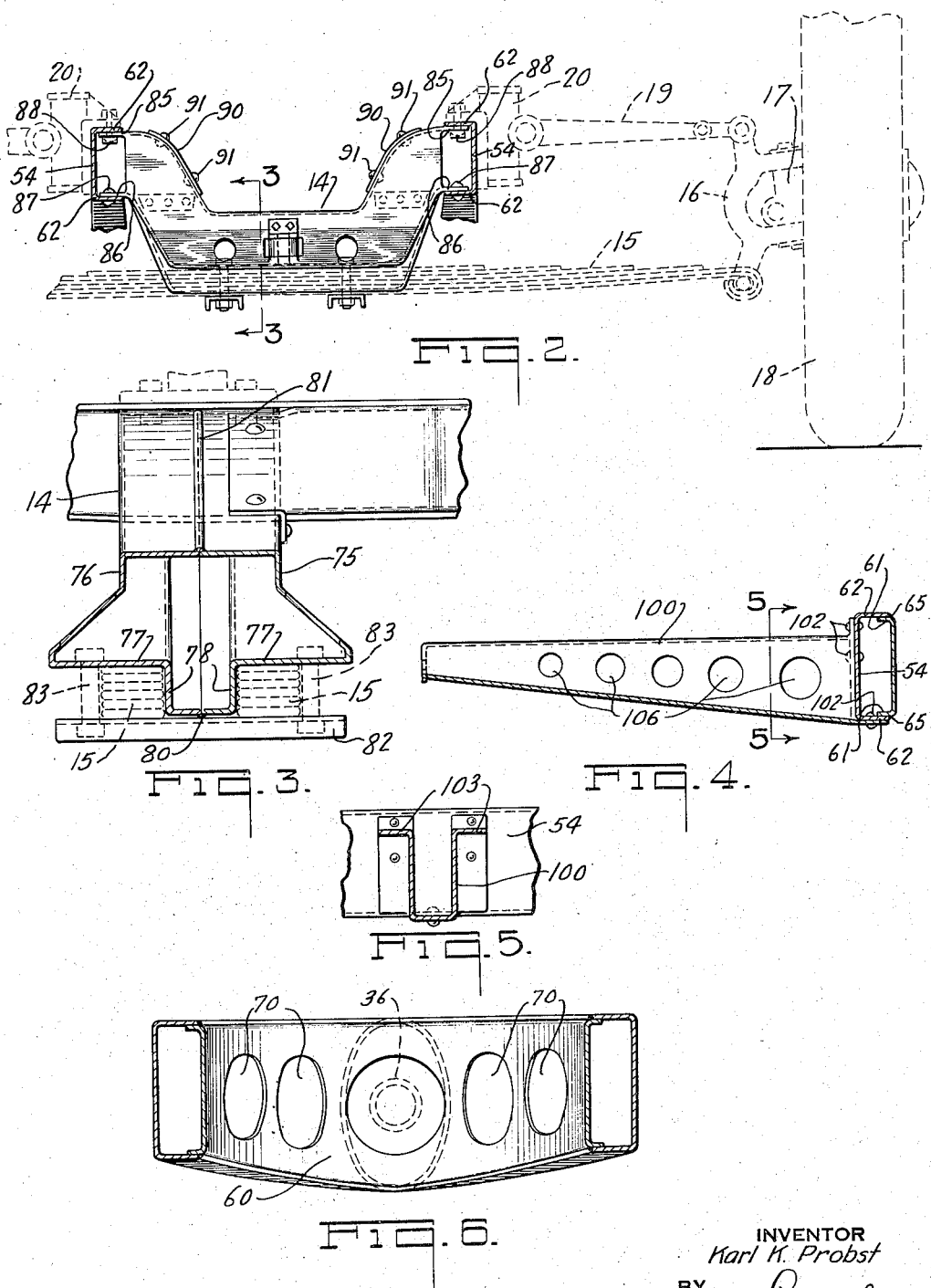

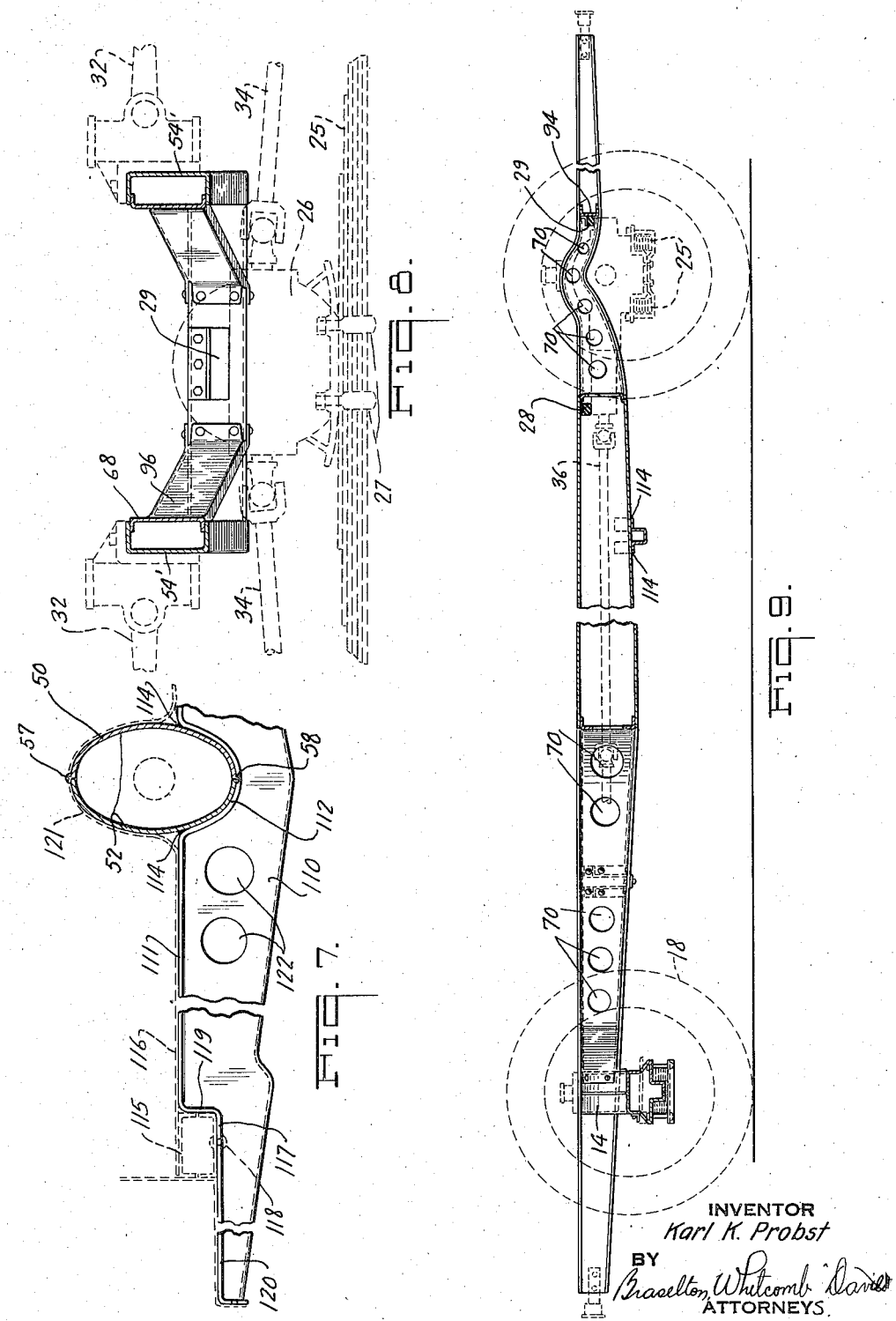

Dec. 28, 1937.  K. K. PROBST  2,103,915
VEHICLE CONSTRUCTION
Original Filed May 15, 1934  4 Sheets-Sheet 4
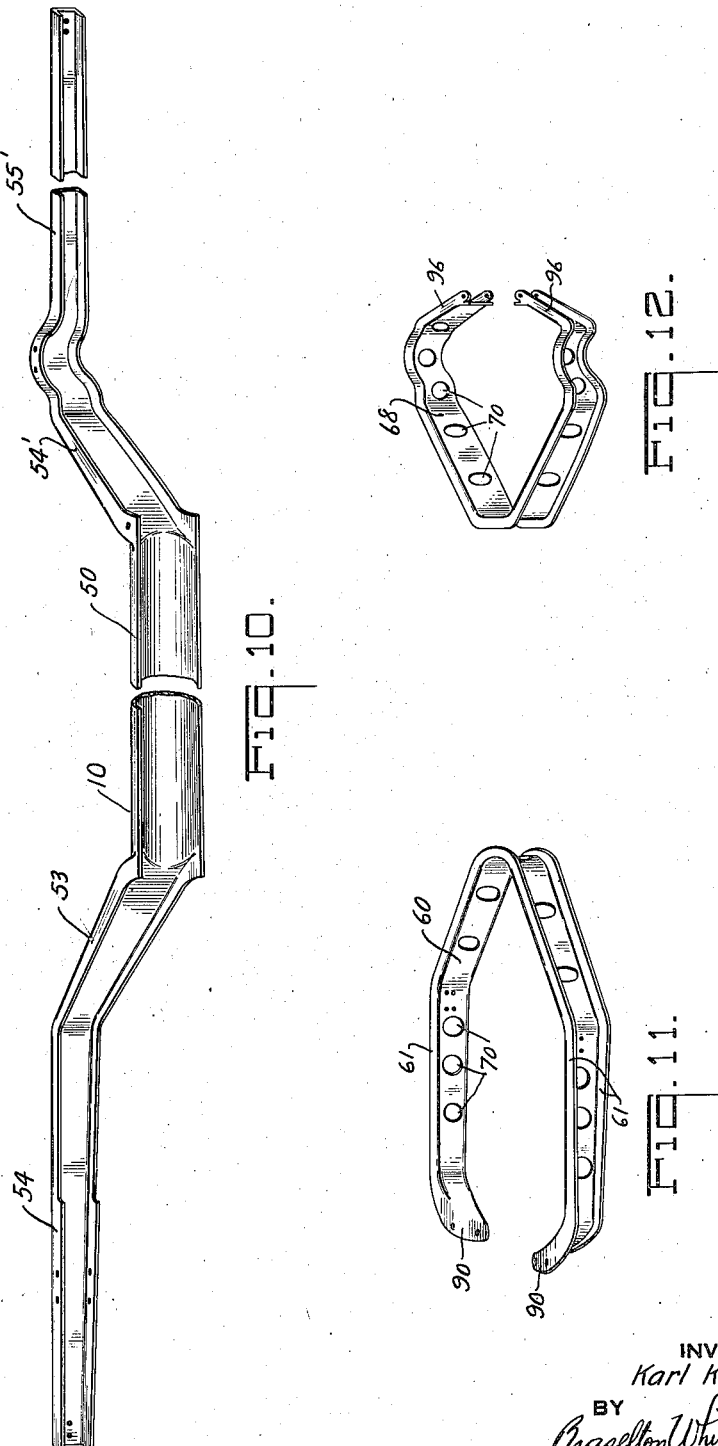
INVENTOR
Karl K. Probst
BY
Braselton Whitcomb Davis
ATTORNEYS.

Patented Dec. 28, 1937

2,103,915

UNITED STATES PATENT OFFICE 2,103,915

VEHICLE CONSTRUCTION

Karl K. Probst, Toledo, Ohio, assignor to General Motors Corporation, Detroit, Mich., a corporation of Delaware Application May 15, 1934, Serial No. 725,769
Renewed January 11, 1937

14 Claims. (Cl. 280—106)

This invention relates to vehicle constructions and particularly to improvements in a vehicle chassis and frame assembly.

The invention embraces a frame construction for vehicles and method of producing same in which the major frame construction is formed of sections welded or otherwise secured together providing a rigid and torque resisting arrangement with a minimum of weight of material.

The invention contemplates the provision of a frame structure having an amidship tubular portion especially adapted for resisting torque which portion extends into bifurcated portions in combination with transverse members for supporting the vehicle springs and body.

Another object of the invention is the provision of a frame construction and associated reinforcing elements forming in themselves means for supporting transverse springs in vehicles having the so-called independently sprung wheel suspension.

A further object of the invention includes the method of producing a frame for vehicles which consists of the formation and bending of sheet metal members to a predetermined configuration and welding juxtaposed portions of the members together.

Still a further object of the invention is the provision of a chassis frame assembly for vehicles which is formed of mating sections welded together in conjunction with transverse bars and supporting members wherein the weight of such an arrangement and the cost thereof over prior constructions is substantially reduced.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 2 is a transverse vertical sectional view through the frame construction taken substantially on the line 2—2 of Figure 1;

Figure 3 is a vertical sectional view through the spring supporting means taken substantially on the line 3—3 of Figure 2;

Figure 4 is a detailed view showing one of the body supporting elements of the frame, the view being taken on substantially the line 4—4 of Figure 1;

Figure 5 is a detailed sectional view taken on the line 5—5 of Figure 4;

Figure 6 is a transverse sectional view taken on the line 6—6 of Figure 1;

Figure 7 is a transverse fragmentary sectional view showing the central tubular section of the frame and one of the body supporting elements, the view being taken on the line 7—7 of Figure 1;

Figure 8 is a transverse, vertical sectional view taken substantially on the line 8—8 of Figure 1;

Figure 9 is a longitudinal vertical sectional view of the frame construction taken on the line 9—9 of Figure 1;

Figure 10 is an isometric view of one of the component sections of the vehicle frame;

Figure 11 is an isometric view showing one of the reinforcing channel section components of the frame structure;

Figure 12 is an isometric view showing another reinforcing section of the frame structure.

Figure 1:
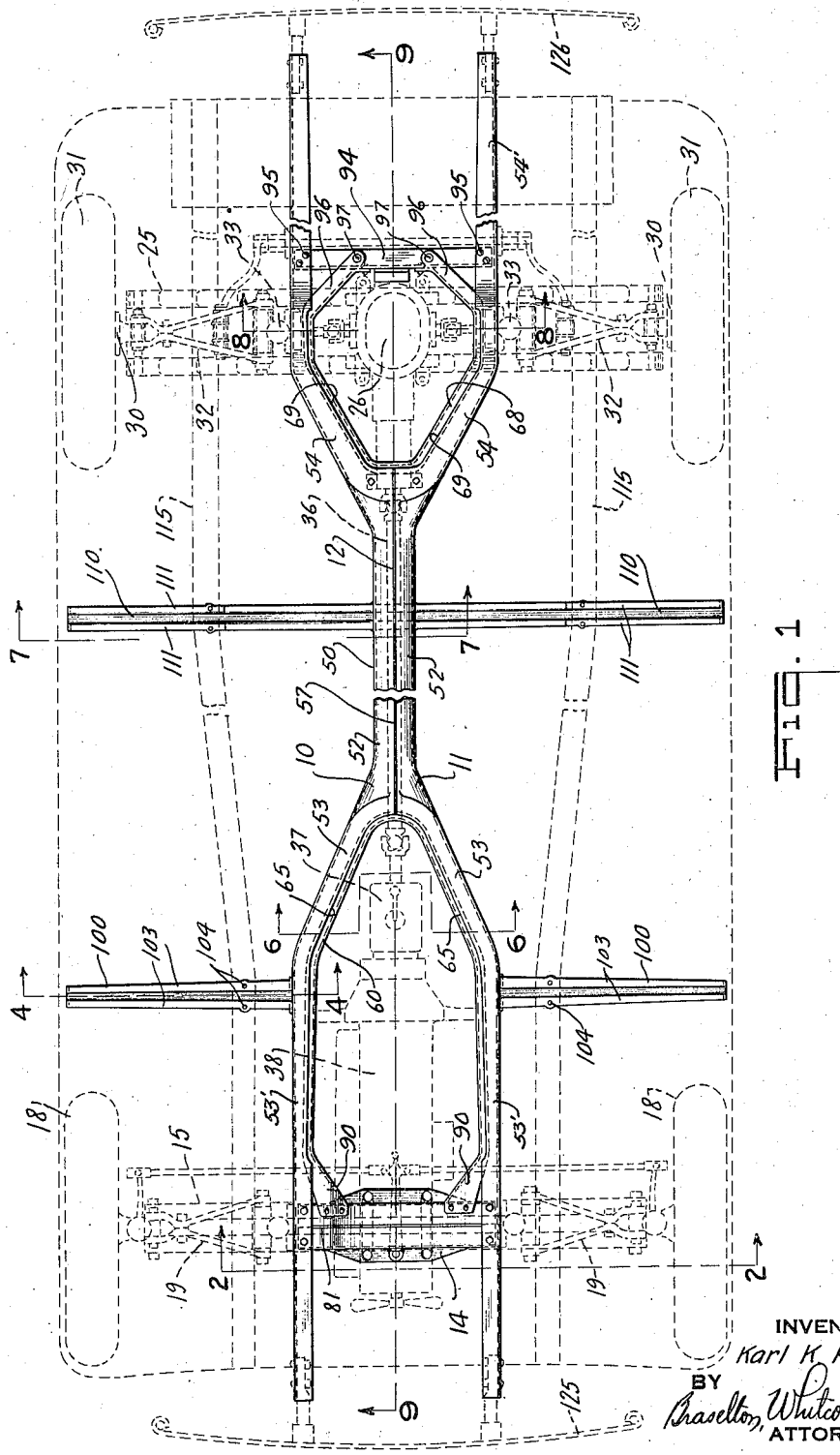
Figure 1 is a top plan view of a vehicle construction of my invention showing the assembled frame construction in full lines.

I have illustrated my invention as embodying a frame construction and associated parts as forming the chassis of an automobile vehicle, particularly adaptable for vehicle constructions in which the vehicle wheels are independently supported, but it is to be understood that I contemplate the use of my invention with any type of vehicle with which it is found to be capable of conjoint use.

Referring to the drawings in detail, 10 and 11 indicate two major frame elements which are of similar configuration and are welded or otherwise secured together amidship as at 12 by welding to form a central tubular section, the extremities being of bifurcated formation as illustrated. Adjacent the forward portion of the frame is a transversely extending member 14 which forms a spring seat, hereinafter described in detail, supporting transverse springs 15, the outer extremities of which are connected to members 16 carrying wheel spindles 17, these in turn supporting vehicle front wheels 18. The members 16 are maintained in operative association with the springs 15 by means of links 19 connected to shock absorber mechanisms 20, the latter in turn being secured to the frame construction of the vehicle in any suitable manner.

In the embodiment illustrated, the rear springs 25 of the vehicle extend transversely thereof and are secured to a differential casing 26 by means of brackets 27, the differential casing being mounted on rubber supports 28 and 29 as illustrated in Figure 9. The springs 25 are suitably connected to wheel spindles or supporting means 30 carrying the vehicle rear wheels 31, member 30 being maintained in proper substantially vertical position by means of links 32 connected with shock absorbing means 33 in much the same manner as are the front wheels illustrated in Figure 2, the shock absorbing means in turn being mounted upon the frame structure of the vehicle. The vehicle suspension system illustrated forms subject matter of my co-pending application, Serial No. 720,755.

The differential housing 26 encloses suitable gearing (not shown) connected with two transversely extending drive shafts 34 for driving the rear wheels of the vehicle. The gearing contained within the differential housing 26 is actuated by means of a propeller or main drive shaft 36 connected to a gear set or transmission mechanism 37 and the engine or prime mover 38.

The frame construction forming part of my invention is inclusive of the two sheet metal members 10 and 11 which are bent and formed into similar sections jointed together about a vertical axis providing a centrally positioned torque resisting section 50 of hollow or tubular configuration. Each section comprises a curved or semi-oval central configuration 52 and angularly extending integral portions 53, 54, preferably of channel shaped cross-section which continue into portions 53', 54', of channel shaped cross-section arranged in the embodiment illustrated in substantially parallel relationship with respect to the tubular section 52. These major sections formed from sheet metal produce an integral and extremely rigid construction as hereinafter explained. In assembly, the two mating sections 10 and 11 are joined together at the semi-oval configurations 52 the juncture of the sections being welded along the lines 57 and 58, particularly as illustrated in Figures 1 and 7, the walls of the sections forming the tubular portions 50.

It is desirable in order to provide an exceptionally rigid construction to form portions 53 and 54 of the frame of channel formation and reinforce same to provide box-like or tubular cross-sections. To this end a member 60 of a U-shaped formation and as illustrated is channel shaped in cross-section being positioned or embraced in the forward bifurcated configuration formed by the diverging and parallel extensions of the frame member 11 as particularly illustrated in Figure 1. The side walls 61 of the members 60 snugly fit the side walls 62 of the channel shaped sections 53 and 54 of the major frame members as illustrated in Figure 4, these walls being welded together as at 65 or otherwise secured. The forwardly and rearwardly extending portions 53' and 54' of the frame sections 10 and 11 are also of channel shaped configuration in cross-section and positioned between these members is a U-shaped member 68 also of channel cross-section generally similar to the member 60. This member is assembled with the major frame sections 10 and 11 as illustrated in Figure 1 having overlapping side walls which are welded together along the line 69. By this construction it is to be noted that the torque resisting tubular section 50 located amidship is structurally integral with the box-like tubular extensions which arrangement has exceptional strength and torque resisting properties with a minimum of weight of material. The side walls of the major sections 10 and 11 may be perforated as illustrated at 70 to further lighten the structure without impairing the strength of the assembly.

A simple yet effective means of supporting the front springs of the vehicle is incorporated consisting of a pair of similarly shaped members or sections 75 and 76, having horizontal portions 77 forming spring seats or supports for the spring assemblies 15, each section having a depending portion 78 for positively positioning the spring assemblies in fixed relationship. The sections 75 and 76 are formed with horizontal portions having meeting edges which are joined together by welding as at 80 and 81 forming a combined transverse frame reinforcing and spring seat member of closed cross-section. The springs are secured to the supporting seats 77 by suitable means as, for example, channel shaped bars 82 secured to members 75 and 76 by means of bolts 83 as shown in Figure 2. The extremities of the cross-member 14 formed by sections 75 and 76 project upwardly and have upper and lower wall portions 85 and 86 which snugly fit the side walls 62 of the frame portions 53' and are riveted as indicated at 87 and 88 or otherwise secured together. The extremities of the U-shaped member 60 are formed into converging flat portions 90 which are riveted as at 91, welded or otherwise secured to the transverse member 14 formed of sections 75 and 76. By this arrangement there is provided a tubular or box-like transversely extending cross-member 14 which increases the rigidity of the frame construction, this cross-member also functioning as the support for the vehicle springs without the addition of other elements.

The rearwardly extending portions 54' of the frame construction are preferably joined together by means of a channel shaped transversely extending member 94 riveted as at 95 or otherwise secured to the portions 54', the extremities of the reinforcing channel shaped member 68 having converging ends 96 which are riveted or otherwise secured to the cross-member 94 as at 97. In the embodiment illustrated the channel shaped cross-member 94 serves to support a block 29 of resilient material which in turn supports the differential housing 26 of the power transmission mechanism.

My invention is inclusive of a simple and yet effective and efficient method for producing the major frame sections 10 and 11. The method consists in severing from a sheet of comparatively thin gauge metal a blank of the proper configuration and bending or depressing the blank centrally and forming the central curved portion 50 adjacent forwardly and rearwardly projecting portions with lateral flanges producing the channel-shaped portions 53' and 54', as well as the intermediate channel-shaped portions 53 and 54. By this method, the matched frame sections may be produced in large quantities with a maximum degree of uniformity and accuracy in the product. The U-shaped reinforcing sections 60 and 68 may also be formed preferably of thin gauge sheet material and formed and bent to the desired configurations as illustrated in Figures 11 and 12.

Means preferably forming a part of the frame structure are provided for supporting the vehicle body including transversely extending channel-shaped members 100 which are riveted or otherwise secured as at 102 to the parallel portions 53' of the forward portion of the frame structure. The channel-shaped members 100 have horizontally extending flanges 103 facing upwardly upon which the vehicle body may be directly mounted and bolted, the securing bolts passing through openings 104 in the flanges 103 of members 100. The outer portions of the members 100 are also adapted to support the running boards (not shown) of the vehicle. The side walls of members 100 may have openings 106 for purposes of further reducing the weight of the construction.

The body is further supported by a transversely extending U-shaped member 110 having lateral flanges 111 and a depressed central portion 112 which snugly fits the curved lower portion of the central tubular section 52 of the frame proper, the member 110 being welded as at 114 to the tubular frame section. The body structure, a portion of which is shown in dotted lines in Figures 1 and 7, preferably includes a box-like horizontal base section 115 and a metallic floor structure 116, the latter resting upon the uppermost faces of the flanges 111, the floor structure of the body 116 having a raised central portion 121 adapted to extend over the central tubular section 52 of the frame, as shown in dotted lines in Figure 7. The member 110 at its extremities is preferably provided with a depressed portion 117 to accommodate the box-like or tubular portion 115 of the vehicle body, the portion 115 being secured to depressed portion 117 and member 110 by means of rivets 118 or other suitable means, the upwardly projecting wall 119 of the depressed portion of member 110 serving to prevent lateral shifting of the vehicle body. By this means, in assembly, the body may be readily and quickly positioned upon the vehicle frame and quickly secured in place. The extremities 120 of the member 110 form a suitable supporting means for the running board of the vehicle. The weight of the member 110 may be reduced by the inclusion of openings 122 in the side walls thereof.

It is herein pointed out that the extensions 53' and 54' of the main frame construction form suitable supports for the bumper or fender constructions 125, 126 so that shocks imparted to the vehicle through contacts with other vehicles or obstructions are resisted by the main frame construction of the vehicle. It is also to be noted that the propeller or drive shaft 36 extends through the tubular central section of the frame, providing a housing for the latter.

It is apparent that, within the scope of the invention, modifications and different arrangements may be made other than is herein disclosed, and the present disclosure is illustrative merely, the invention comprehending all variations thereof.

What I claim is:

1. A vehicle frame comprising a central tubular portion terminating in spaced furcations; two U-shaped members, one U-shaped member secured to and embraced by each of said furcations; and a transversely extending member joining the branches of each of said furcations forming vehicle spring supporting means.

2. A vehicle frame comprising matched similar sections forming a central tubular portion terminating at its extremities in spaced furcations; a U-shaped reinforcing member secured to and embraced by said furcations; and a cross member joining said furcations forming vehicle spring supporting means.

3. A vehicle frame comprising two similar sections in assembled relation forming a central tubular portion; means for securing said sections together, the extremities of said frame being of bifurcated formation; U-shaped reinforcing members joining the furcations of each frame section and transversely extending body supporting members secured to said tubular and bifurcated portions of said frame structure.

4. In a vehicle in combination, a frame having a central tubular portion and bifurcated forward and rearwardly extending portions; a cross member connecting said forwardly extending portions of said frame; transverse springs carried by said cross member; a second cross member connecting the rearwardly extending bifurcated portion of said frame and adapted to support a housing enclosing a power transmission mechanism.

5. A frame construction for vehicles comprising mating similar sections having central engaging portions secured together, said frame having diverging channel-shaped forward and rearward extensions; reinforcing members secured to and embraced by said extensions; and a channel-shaped member extending transversely of said frame and welded to the tubular central section of said frame.

6. A frame construction for vehicles comprising mating similar sections having central engaging curved portions secured together forming a tubular section; said frame having diverging forward and rearward extensions of channel-shaped cross-section; U-shaped reinforcing members secured to and embraced by said extensions; and a channel-shaped member extending transversely of said frame and welded to the tubular central section of said frame.

7. A frame construction for vehicles comprising mating similar sections having central engaging curved portions having edges welded together along a vertical plane, said frame having diverging channel-shaped forward and rearward portions terminating in spaced substantially parallel portions; reinforcing members secured to said diverging portions; a channel-shaped member extending transversely of said frame and welded to the tubular central section of said frame; and channel-shaped members secured to and extending transversely of the forwardly extending spaced portions of said frame.

8. A frame construction for vehicles comprising mating similar sections formed of sheet material provided with central engaging curved portions having edges welded together forming a tubular central section, said frame having diverging forward and rearward portions; reinforcing members secured within said diverging portions; a channel-shaped member extending transversely of said frame and secured to the tubular central section of said frame; and channel-shaped members secured to and extending transversely of the forwardly extending diverging portions of said frame.

9. In a vehicle the combination of a frame comprising two similar formed sheet metal sections, when in assembled relation forming a central tubular portion, the extremities of said frame being bifurcated; channeled members embraced by said furcations to form tubular sections therein; a member formed of mated sections welded together connecting one of said sets of furcations adapted to form a support for the front springs of the vehicle, the other of said sets of furcations being connected by a cross member adapted to support a housing enclosing power transmission mechanism.

10. In a vehicle the combination of a frame formed of mated sections of sheet metal welded adjacent their central portions to form a central tubular portion and bifurcated forwardly and rearwardly extending portions; a spring supporting member joining one of said sets of furcations, said member being formed of matched hollow sections welded together; and channeled inserts carried by said furcations to form tubular sections therein.

11. A vehicle frame comprising a central tubular part terminating at each end in a furcation, the tines of said furcation being channel shaped in cross section, reinforcing members channel shaped in cross section, one member for each furcation, said members extending longitudinally of the tines of the furcations and having the channels facing the channels of the tines and forming therewith a box-sectioned construction.

12. A vehicle frame comprising a central tubular part terminating at each end in a furcation, reinforcing means for the furcations, said means and the tines of said furcations being channel shaped in cross section, said means extending longitudinally of the tines of the furcations and forming therewith a box-sectioned construction.

13. A vehicle frame comprising two similar sections formed of sheet metal, the central portions of said sections being welded together to form a tubular configuration, the extremities of said sections in assembled relationship forming furcations, a cross member secured transversely of one furcation, and a substantially U-shaped reinforcing member secured to said furcation.

14. A vehicle frame comprising two similar sections, the central portions of said sections being welded together to form a tubular configuration, extremities of said sections in assembled relationship forming furcations, the branches of the furcations being of channel-shaped cross section, cross members, one cross member secured transversely of each furcation, and substantially U-shaped reinforcing members secured to the walls of said furcations.

KARL K. PROBST.